United States Patent
Shimizu et al.

(10) Patent No.: US 10,418,613 B2
(45) Date of Patent: Sep. 17, 2019

(54) ELECTRICITY STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroshi Shimizu, Mie (JP); Hiroomi Hiramitsu, Mie (JP); Katsushi Miyazaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 226 days.

(21) Appl. No.: 15/523,984

(22) PCT Filed: Nov. 5, 2015

(86) PCT No.: PCT/JP2015/081131
§ 371 (c)(1),
(2) Date: May 3, 2017

(87) PCT Pub. No.: WO2016/080196
PCT Pub. Date: May 26, 2016

(65) Prior Publication Data
US 2018/0308634 A1    Oct. 25, 2018

(30) Foreign Application Priority Data

Nov. 21, 2014    (JP) ................... 2014-236740

(51) Int. Cl.
*H01M 2/26* (2006.01)
*H01M 2/20* (2006.01)
(Continued)

(52) U.S. Cl.
CPC .............. *H01M 2/266* (2013.01); *H01G 2/04* (2013.01); *H01G 11/12* (2013.01); *H01G 11/74* (2013.01);
(Continued)

(58) Field of Classification Search
CPC .... H01M 2/10; H01M 2/1061; H01M 2/1077; H01M 2/20; H01M 2/266
(Continued)

(56) References Cited

U.S. PATENT DOCUMENTS

2001/0049054 A1    12/2001    Enomoto et al.
2004/0028999 A1*    2/2004    Richard ................. H01M 2/26
                                                                429/149
(Continued)

FOREIGN PATENT DOCUMENTS

JP    2002-358945    12/2002
JP    2011-210480    10/2011
(Continued)

OTHER PUBLICATIONS

Search Report issued in International Bureau of WIPO Patent Application No. PCT/JP2015/081131, dated Jan. 12, 2016.
U.S. Appl. No. 15/523,542 by Shimizu et al. filed May 1, 2017.

*Primary Examiner* — Bryan D. Ripa
*Assistant Examiner* — James M Erwin
(74) *Attorney, Agent, or Firm* — Greenblum & Bernstein, P.L.C.

(57) ABSTRACT

An electricity storage module includes: an electricity storage element group formed by stacking multiple electricity storage elements each having lead terminals of a cathode and an
(Continued)

anode; and a connection member that is joined to the lead terminals. A cathode lead terminal and an anode lead terminal are composed of different metal materials, and the connection member is formed by joining a first metal portion that is connected to the cathode lead terminal and is composed of the same metal material as the cathode lead terminal, and a second metal portion that is connected to the anode lead terminal and is composed of the same metal material as the anode lead terminal. The first metal portion and the second metal portion each have a terminal joining portion joined with a lead terminal and a member joining portion at which the first metal portion and the second metal portion are joined.

3 Claims, 9 Drawing Sheets

(51) Int. Cl.
  *H01M 2/10*     (2006.01)
  *H01G 11/74*    (2013.01)
  *H01G 2/04*     (2006.01)
  *H01M 2/30*     (2006.01)
  *H01M 10/647*   (2014.01)
  *H01G 11/12*    (2013.01)
  *H01G 11/76*    (2013.01)
  *H01M 2/02*     (2006.01)
  *H01M 10/48*    (2006.01)

(52) U.S. Cl.
  CPC ............ *H01G 11/76* (2013.01); *H01M 2/024* (2013.01); *H01M 2/10* (2013.01); *H01M 2/1061* (2013.01); *H01M 2/1077* (2013.01); *H01M 2/20* (2013.01); *H01M 2/206* (2013.01); *H01M 2/30* (2013.01); *H01M 10/482* (2013.01); *H01M 10/647* (2015.04)

(58) Field of Classification Search
  USPC .......................................................... 429/163
  See application file for complete search history.

(56) References Cited

U.S. PATENT DOCUMENTS

| | | |
|---|---|---|
| 2011/0256445 A1 | 10/2011 | Kim et al. |
| 2012/0135295 A1 | 5/2012 | Kim et al. |
| 2012/0301763 A1* | 11/2012 | Tonomura ............... H01M 2/06 429/99 |
| 2013/0012079 A1 | 1/2013 | Sakae et al. |
| 2013/0029198 A1 | 1/2013 | Suzuki |
| 2015/0243450 A1 | 8/2015 | Shimoda et al. |
| 2015/0303415 A1 | 10/2015 | Kayano et al. |

FOREIGN PATENT DOCUMENTS

| | | |
|---|---|---|
| JP | 2011-210482 | 10/2011 |
| JP | 2011-228302 | 11/2011 |
| JP | 2012-119295 | 6/2012 |
| JP | 2012-221804 | 11/2012 |
| JP | 2013-054823 | 3/2013 |
| JP | 2014-002988 | 1/2014 |
| JP | 2014-078372 | 5/2014 |
| JP | 2014-135163 | 7/2014 |
| WO | 2011/145542 | 11/2011 |
| WO | 2014/073443 | 5/2014 |
| WO | 2014/073443 | 9/2016 |

* cited by examiner

ELECTRICITY STORAGE MODULE

TECHNICAL FIELD

The present invention relates to an electricity storage module.

BACKGROUND ART

In an electricity storage module formed by stacking multiple electricity storage elements, lead terminals of adjacent electricity storage elements are connected through ultrasonic welding in some cases. In such a case, a gap into which a welding jig is inserted needs to be ensured in the electricity storage module, and therefore the number of layers of the electricity storage elements are limited and the overall size increases in some cases.

As a means for solving the above-described problem, there exists a method of joining lead terminals using laser welding. However, for example, if the metal materials constituting the two electrode terminals are different, as in the case of joining a cathode terminal made of aluminum and an anode terminal made of copper, it is difficult to perform joining through laser welding.

In view of this, if the metal materials constituting the electrode terminals to be connected are different, it is conceivable to use, as a busbar, a clad material obtained by pressure welding a first metal material composed of a metal material of the same type as that of the cathode terminal, and a second metal material composed of a metal material of the same type as that of the anode terminal (e.g., see Patent Document 1).

CITATION LIST

Patent Documents

Patent Document 1: JP 2011-210482A

SUMMARY OF INVENTION

Technical Problem

If the clad material constituting the busbar has a configuration in which the first metal material and the second metal material are arranged in parallel, there exists an overlapping region in which different types of metals overlap. If the overlapping region with different types of metals and the electrode terminals are laser welded, there is a risk that an alloy phase will be formed and the portion at which the terminal and the busbar are joined will be extremely brittle, and therefore it has been difficult to apply the clad material to a busbar connecting laminate-type electricity storage elements with a narrow stacking interval.

The present invention has been achieved based on the above-described circumstance, and it is an object thereof to provide an electricity storage module in which lead terminals composed of different metal materials can be electrically connected in a limited space.

Solution to Problem

The present invention is an electricity storage module including: an electricity storage element group formed by stacking a plurality of electricity storage elements each having lead terminals of a cathode and an anode that protrude from side edges thereof, and a connection member that is joined to the lead terminals and electrically connects the electricity storage elements, wherein a cathode lead element and an anode lead element are composed of different metal materials, the connection member is formed by joining a first metal portion that is connected to the cathode lead terminal and is composed of the same metal material as the cathode lead terminal, and a second metal portion that is connected to the anode lead terminal and is composed of the same material as the anode lead terminal, the first metal portion and the second metal portion each have a terminal joining portion that is joined with a lead terminal and a member joining portion at which the first metal portion and the second metal portion are joined, and the terminal joining portion and the member joining portion are disposed in intersecting directions.

In the present invention, the connection member is formed by joining the first metal portion composed of the same metal material as the cathode lead terminal, and the second metal portion composed of the same metal material as the anode lead terminal. In the connection member, the first metal portion and the second metal portion each have a terminal joining portion joined with a lead terminal, and a member joining portion at which the first metal portion and the second metal portion are joined, and the terminal joining portion and the member joining portion are disposed in intersecting directions.

Accordingly, with the present invention, in the connection member, the member joining portion, at which the two metal portions are joined, and the terminal joining portion joined with the lead terminal are disposed in intersecting directions, and therefore the lead terminal is not joined to a region in which different types of metals overlap when the lead terminal is joined to the connection member. As a result, according to the present invention, the lead terminal can be welded to the entire region of the terminal joining portion, and therefore it is possible to provide an electricity storage module in which lead terminals composed of different metal materials can be electrically connected in a limited space.

Furthermore, with the present invention, the cathode lead terminal is joined to the first metal portion, which is composed of the same metal material, and the anode lead terminal is joined to the second metal portion, which is composed of the same metal material, and therefore corrosion due to contact between different types of metal materials is not likely to occur at the joined portion.

The present invention may have the following configuration.

A holding member that is composed of an insulating material and holds the connection member may be included, and in the connection member, a fixed portion fixed to the holding member may be provided in a direction intersecting with the terminal joining portion, and may be provided so as to protrude outward with respect to the terminal joining portion.

By using this kind of configuration, in the connection member, the fixed portion fixed to the holding member protrudes in a direction intersecting with the terminal joining portion joined with the lead terminal, and protrudes outward with respect to the terminal joining portion, and therefore when a task of joining the lead terminal to the connection member is to be performed, the fixed portion does not hinder the task. Also, according to the above-described configuration, the lead terminal is joined with the connection member held to the holding member, which is composed of an insulating material, and therefore the task of joining the connection member and the lead terminal is easy to perform.

Advantageous Effects of Invention

According to the present invention, an electricity storage module is provided in which lead terminals composed of different metal materials can be electrically connected in a limited space.

DESCRIPTION OF EMBODIMENTS

Embodiment 1

Figure 4:
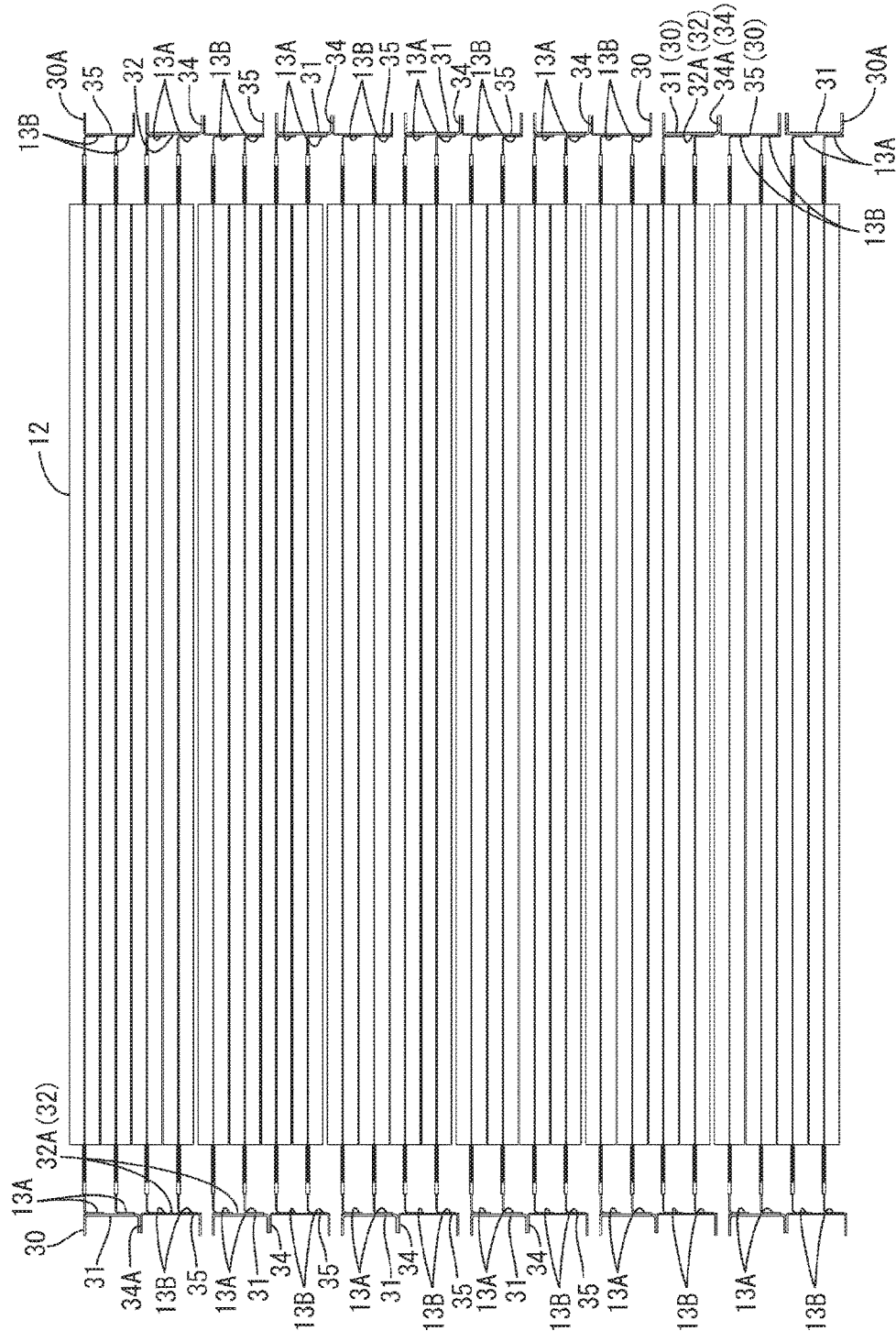
FIG. 4 is a side view showing a state in which connection members have been joined to an electricity storage element group.
Figure 5:
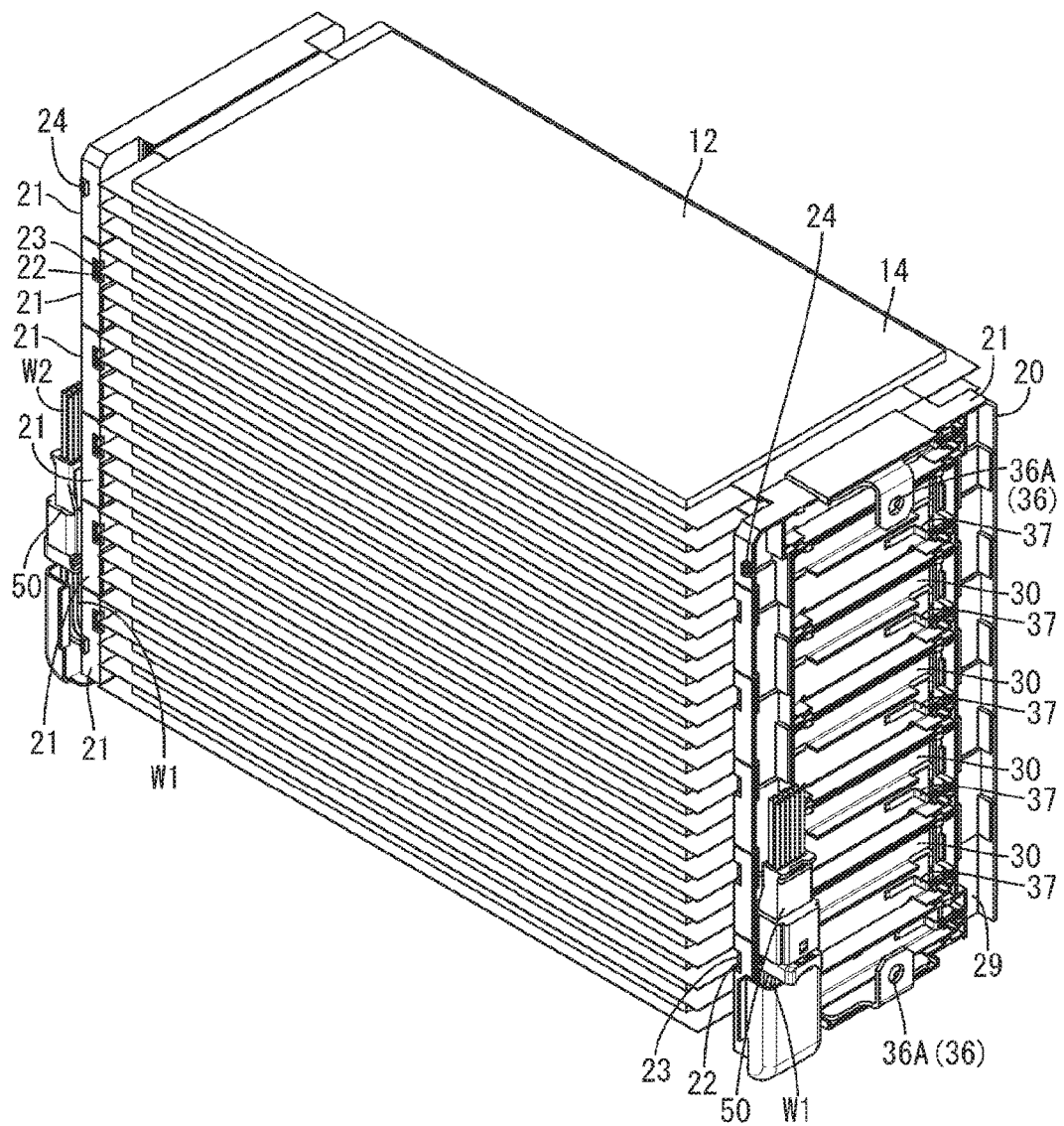
FIG. 5 is a perspective view showing a state in which holding members have been attached to an electricity storage element group.

Embodiment 1 of the present invention will be described with reference to FIGS. 1 to 9. In the drawings, there are cases where only one of multiple members that are the same is denoted by a reference numeral and the other members that are the same are not denoted by reference numerals. In the following description, the upper side in FIG. 2 is up, the lower side is down, the right side in FIG. 4 is frontward (toward the front surface), and the left side is rearward (toward the rear surface).

An electricity storage module 10 of the present embodiment includes an electricity storage element group 11 formed by stacking multiple (in the present embodiment, 24) electricity storage elements 12 having lead terminals 13 that protrude from the side edges thereof, wire modules 20 that have connection members 30 joined to the lead terminals 13 of the electricity storage elements 12 and electrically connect the electricity storage elements 12 and holding members 21 that hold the connection members 30, and the electricity storage module 10 includes a cover 40 that covers the wire module 20.

Cover 40

Figure 1:
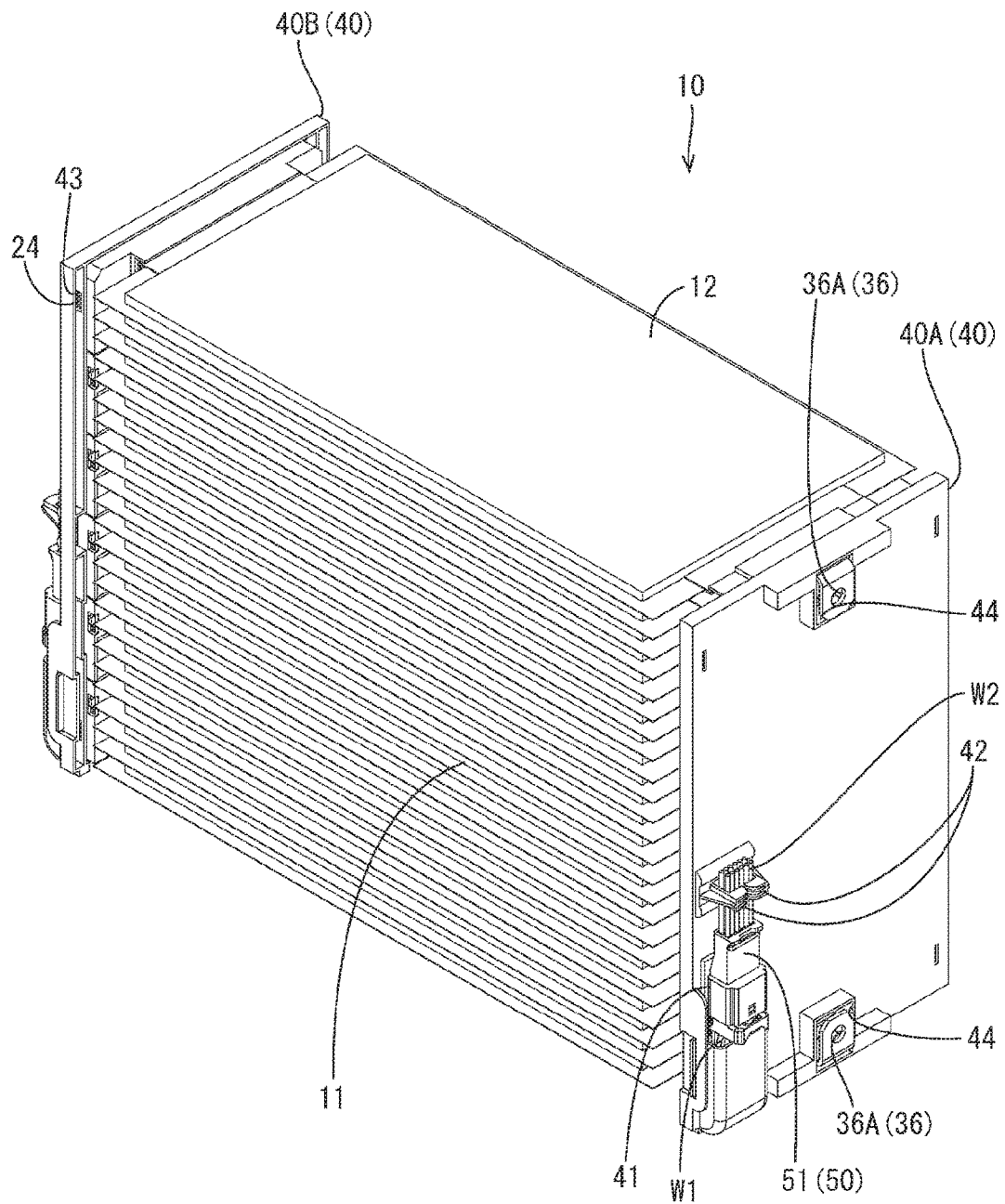
FIG. 1 is a perspective view showing an electricity storage module according to Embodiment 1 from a front surface side.
Figure 2:
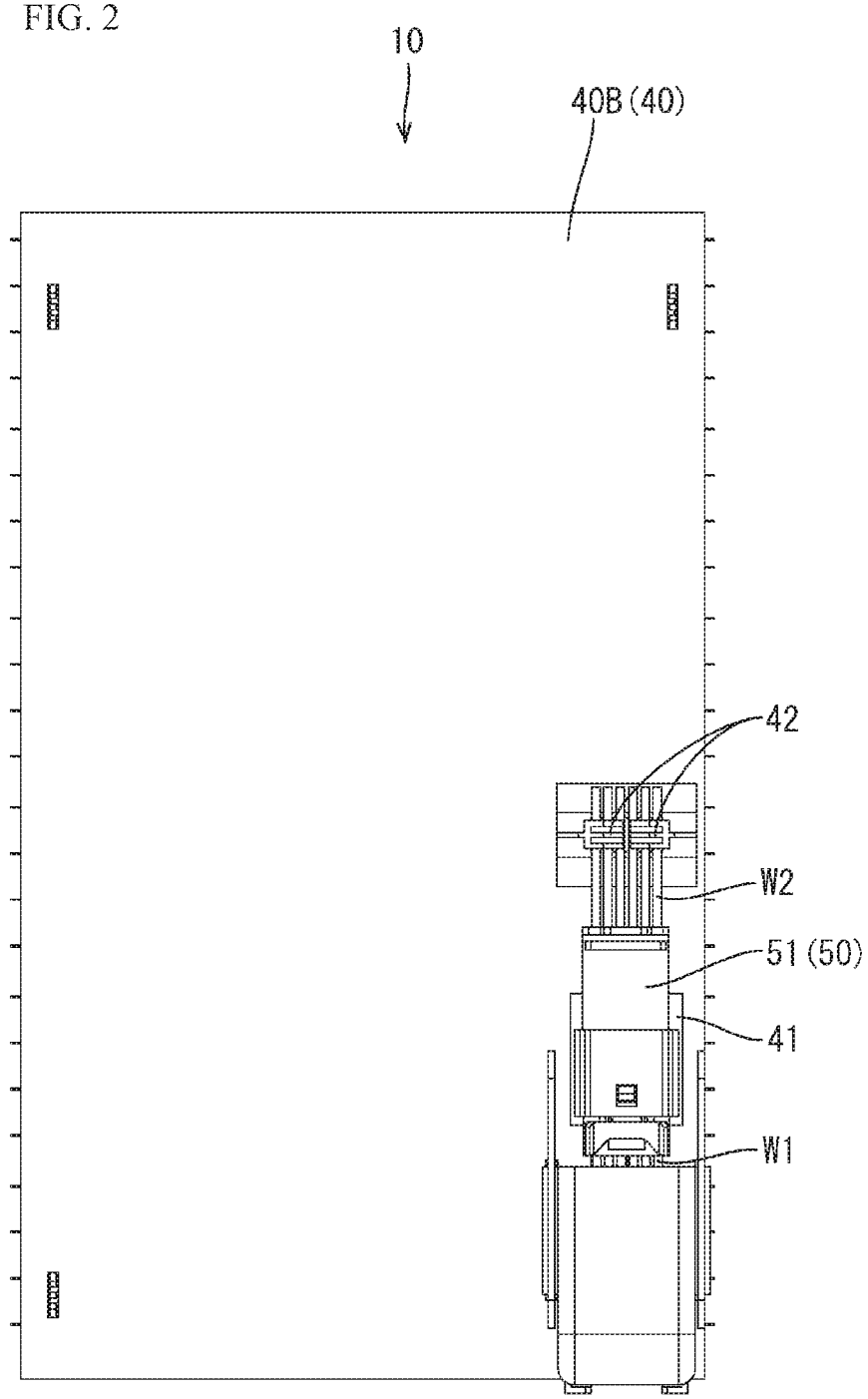
FIG. 2 is a rear view of an electricity storage module.
Figure 3:
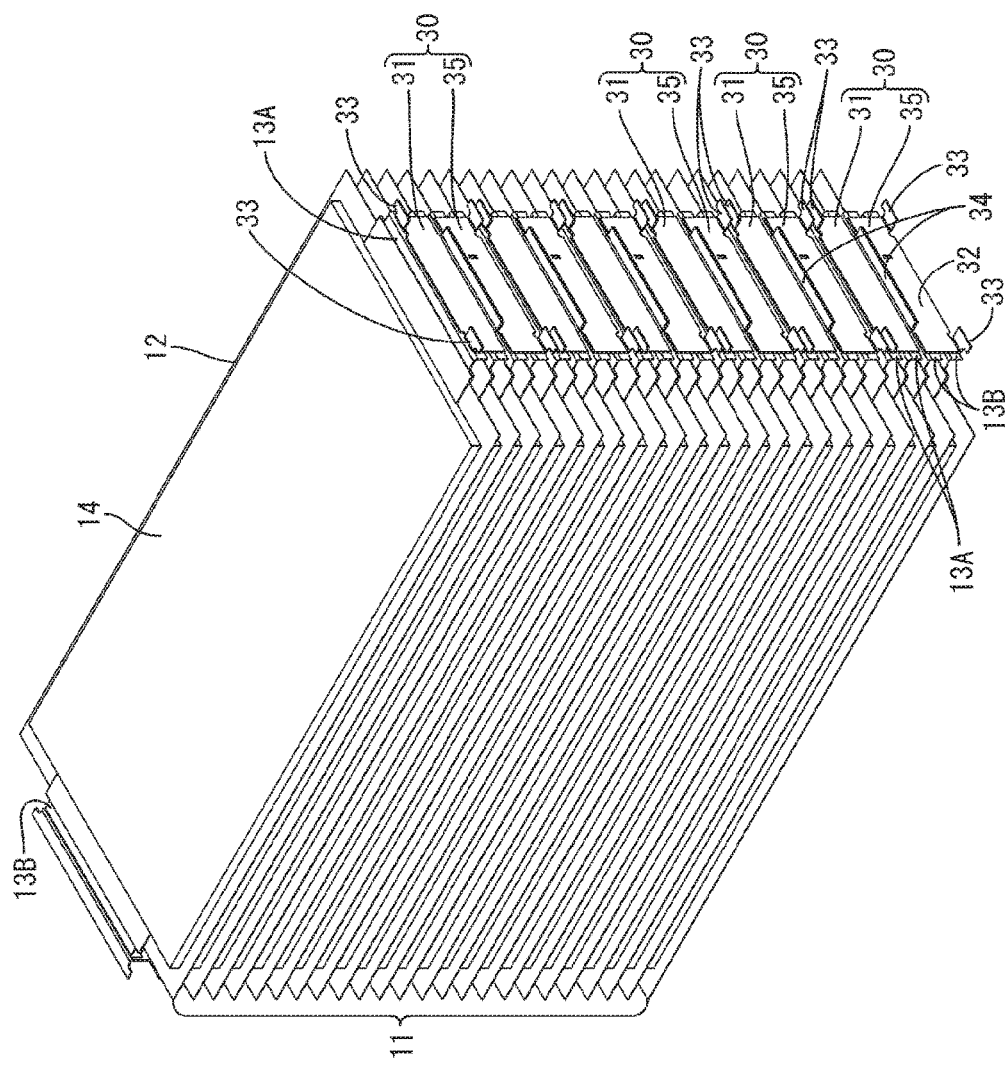
FIG. 3 is a perspective view showing, from a rear surface side, a state in which connection members have been attached to an electricity storage element group.

As shown in FIG. 1, the electricity storage module 10 includes the cover 40, which is made of insulating resin and is disposed on the front surface side and the rear surface side (end portion sides to which the lead terminals 13 are guided) of the electricity storage element group 11. A cover 40A on the front surface side of the electricity storage element group 11 and a cover 40B on the rear surface side are each provided with a connector fixing portion 41 that fixes a connector 50 for electrically connecting a detection terminal 37 that detects a state of the electricity storage elements 12 and a device such as a battery control unit (ECU) (not shown) (see FIGS. 1 and 2). Also, the cover 40A on the front surface side and the cover 40B on the rear surface side are each provided with a pair of wire fixing pieces 42 that fix wires W2 guided from the upper end of a connector housing 51. The cover 40A on the front surface side and the cover 40B on the rear surface side are each further provided with cover attachment holes 43 that receive cover attachment protrusions 24 of a holding member 21 (see FIG. 1).

The upper end and the lower end of the front surface side cover 40A are provided with busbar guiding holes 44 through which an external connection busbar 36 that connects the electricity storage element group 11 and an external device (not shown) are guided. Examples of the external device include another electricity storage module 10 and an inverter. The external connection busbar 36 is composed of a conductive metal material such as copper or a copper alloy, or aluminum or an aluminum alloy, and connection holes 36A electrically connected to the external device are provided so as to penetrate therethrough.

Electricity Storage Elements 12

According to need, any electricity storage elements 12, such as secondary batteries, capacitors, and electric condensers can be used as the electricity storage elements 12 constituting the electricity storage element group 11. Secondary batteries are used as the electricity storage elements 12 according to the present embodiment.

The electricity storage elements 12 each form an approximately rectangular shape in a view from above. The electricity storage elements 12 each include a container 14 that is formed by welding the side edges of a pair of laminate films that form an approximately rectangular shape, an electricity storage component (not shown) that is accommodated inside of the container 14, and lead terminals 13 that are connected to the electricity storage component inside of the container 14 and are guided to the outside from the side edges of the container 14.

Lead Terminals 13

In the present embodiment, the lead terminals 13 of cathodes and anodes (cathode lead terminals 13A and anode lead terminals 13B) are guided from both side edges (forward and rearward side edges) of the containers 14. The cathode lead terminals 13A and the anode lead terminals 13B are composed of different metal materials, and in the present embodiment, the cathode lead terminals 13A are made of aluminum or an aluminum alloy, and the anode lead terminals 13B are made of copper or a copper alloy.

The electricity storage elements 12 are stacked such that the lead terminals 13 thereof with the same polarity are disposed vertically in groups of two, and are connected in parallel by being electrically connected via the connection members 30, although this will be described in detail later.

The external connection busbar 36, which is electrically connected to an external device, is electrically connected to the anode lead terminals 13B of the electricity storage elements 12 disposed at the upper end portion and to the cathode lead terminals 13A of the electricity storage elements 12 disposed at the lower end portion.

Wire Modules 20

The wire modules 20 are attached to the electricity storage element group 11 and are for electrically connecting the multiple electricity storage elements 12. The wire modules 20 include the connection members 30 that are connected to the lead terminals 13 of the electricity storage elements 12 and electrically connect the multiple electricity storage elements 12, and the holding members 21, which hold the connection members 30.

Holding Members 21

The holding members 21 that hold the connection members 30 are composed of an insulating material. In the present embodiment, multiple holding members 21 that are coupled together are attached to the electricity storage element group 11. Coupling protrusions 23 that are coupled by fitting into coupling holes 22 provided in the second holding member 21 from the top are provided on the holding member 21 disposed at the upper end in FIG. 5. The coupling holes 22 that receive the coupling protrusions 23 of the second holding member 21 from the bottom are provided in the holding member 21 disposed at the lower end in FIG. 5.

The holding members 21 other than the holding members 21 disposed at the upper and lower end portions are each provided with coupling holes 22 that receive coupling protrusions 23 of the holding member 21 located thereabove, and with coupling protrusions 23 that fit into coupling holes 22 of the holding member 21 located therebelow.

The cover attachment protrusions 24 that fit into the cover attachment holes 43 of the cover 40 are formed so as to protrude outward on the holding member 21 disposed at the upper end and the holding member 21 disposed at the lower end.

Figure 6:
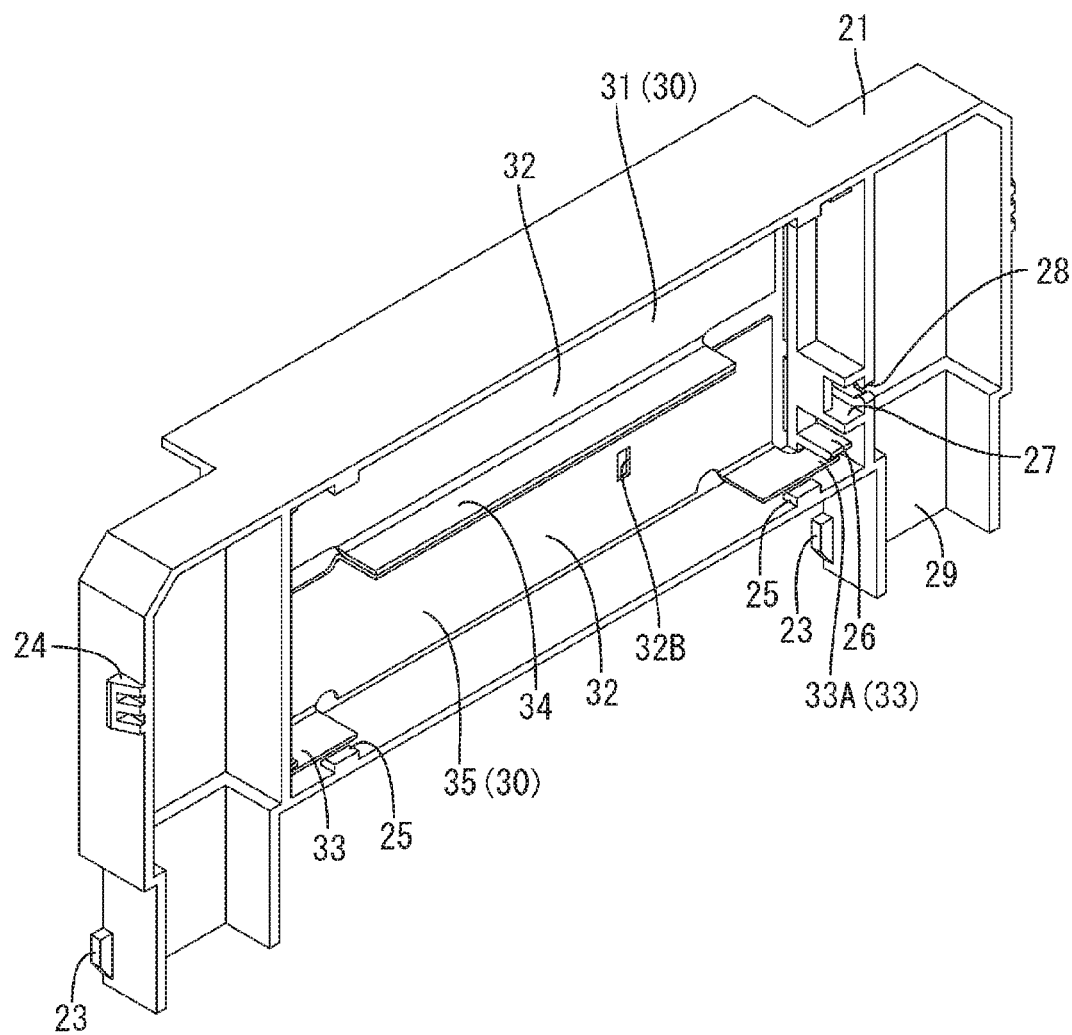
FIG. 6 is a perspective view of a holding member to which a connection member has been attached.
Figure 7:
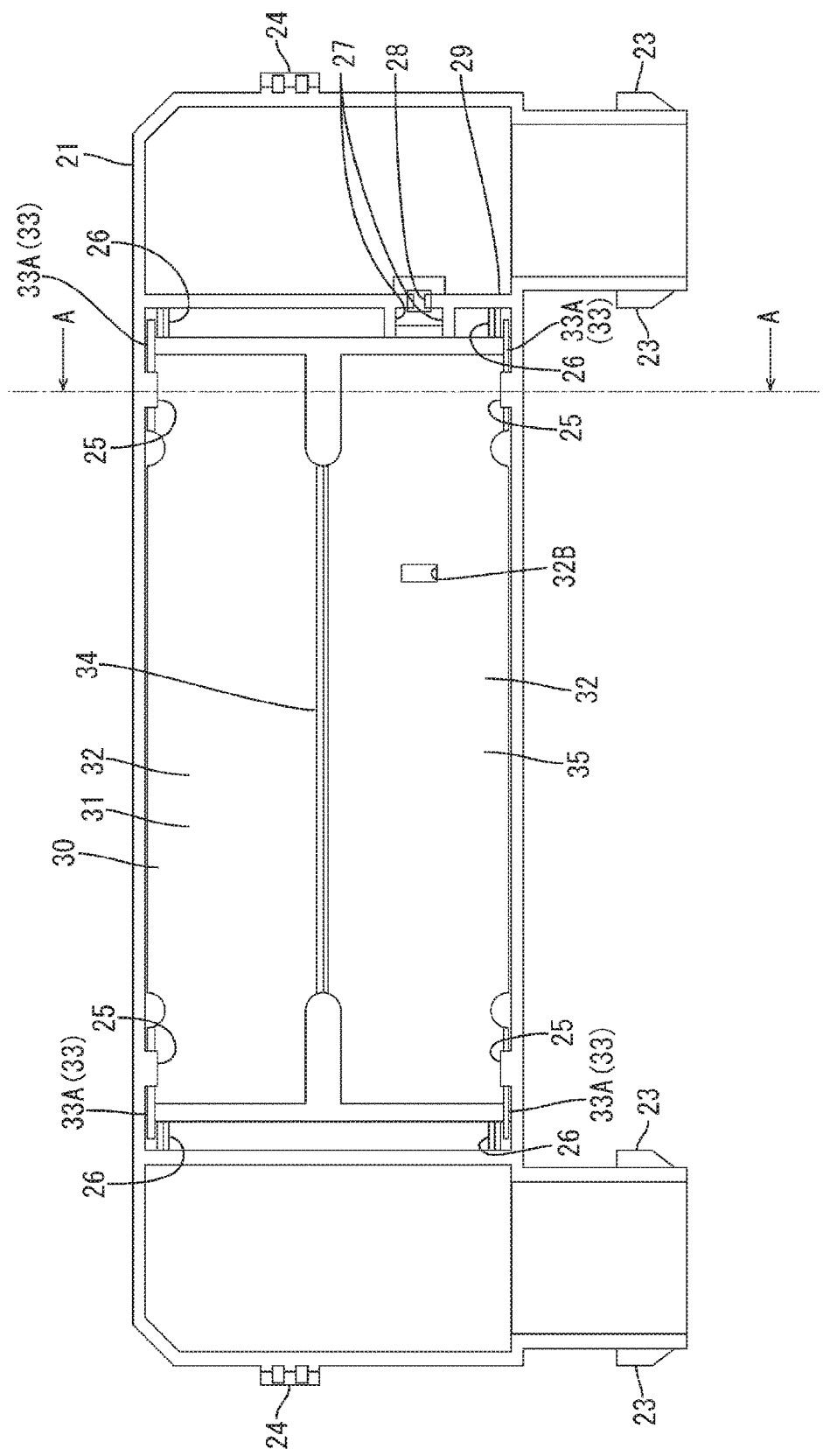
FIG. 7 is a front view of a holding member to which a connection member has been attached.
Figure 8:
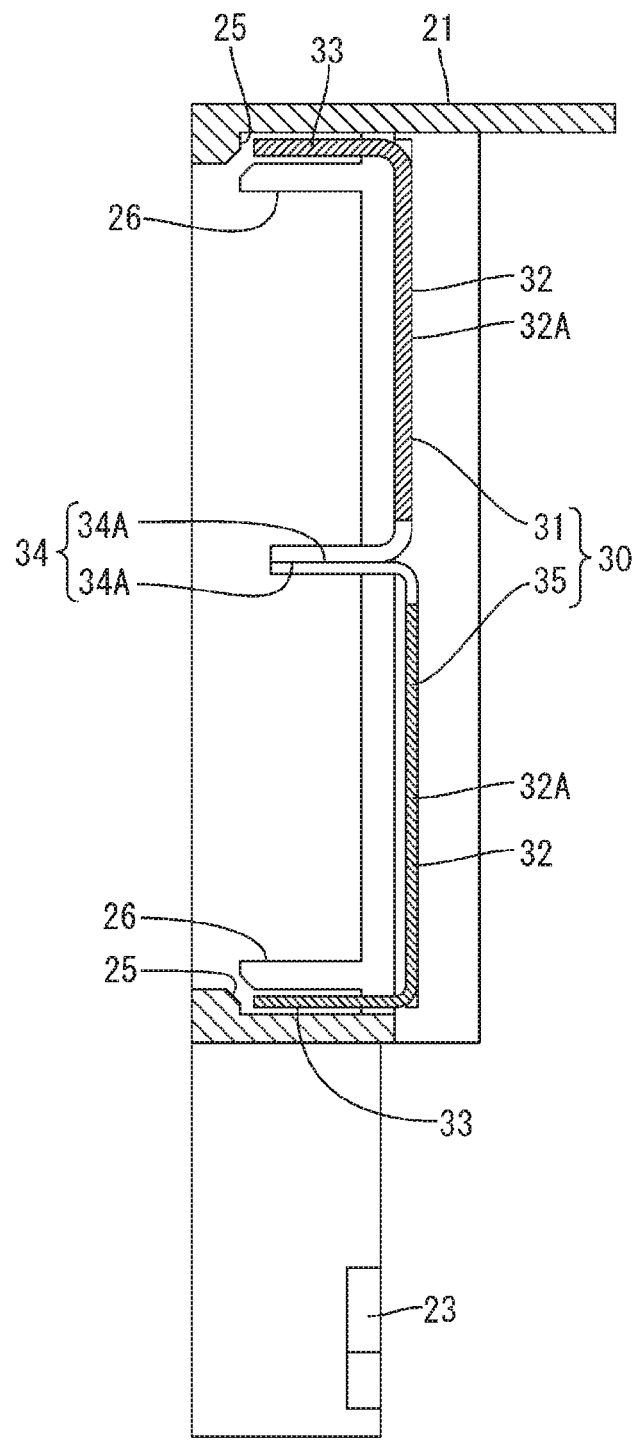
FIG. 8 is a cross-sectional view taken along line A-A in FIG. 7.

As shown in FIGS. 6 and 8, each holding member 21 is provided with retaining protrusions 25 that retain the fixed portions 33 of the connection members 30, and pressing pieces 26 that press the fixed portions 33 of the connection member 30. Also, each holding member 21 is provided with terminal fixing portions 27 that fix a barrel portion 39 of a detection terminal 37, a wire guiding portion 28 that guides a wire W1 connected to the detection terminal 37, and a wire routing portion 29 through which the wire W1 is routed.

The detection terminals 37 are for detecting the voltages and the like of the electricity storage elements 12 and include attachment claws to which the connection members 30 are attached, and barrel portions to which the terminal ends of the wires W1 are connected, although this is not shown in detail in the drawings.

Connection Member 30

Figure 9:
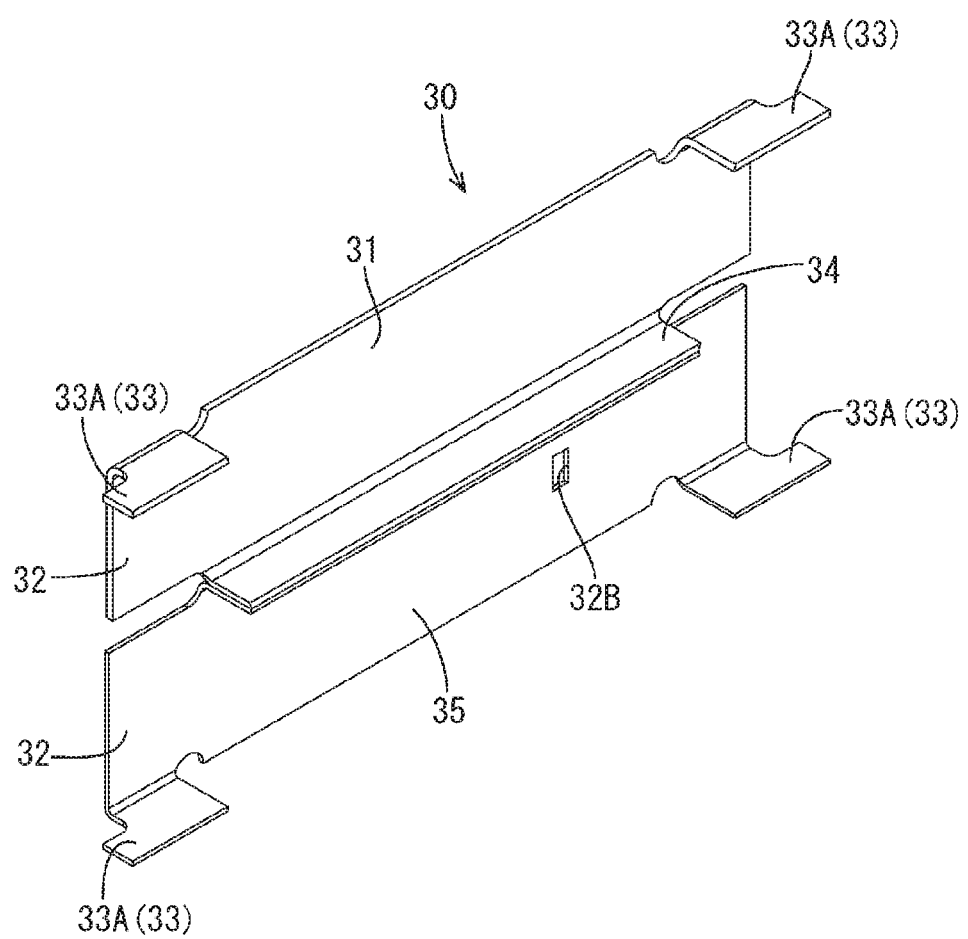
FIG. 9 is a perspective view of a connection member.

As shown in FIG. 9, a connection member 30 to which lead terminals 13 are connected is formed by joining a first metal portion 31, which is connected to cathode lead terminals 13A and is composed of the same metal material as that of the cathode lead terminals 13A, and the second metal material 35, which is connected to anode lead terminals 13B and is composed of the same metal material as that of the anode lead terminals 13B. The first metal material 31 and the second metal material 35 are joined using a known method, such as cold pressure welding or welding, for example. In the present embodiment, the first metal portion 31 is composed of a metal plate material made of aluminum or an aluminum alloy, and the second metal portion 35 is composed of a metal plate material made of copper or a copper alloy.

In the connection member 30, the first metal portion 31 and the second metal portion 35 each have a terminal joining portion 32 that is joined to the lead terminals 13, and a member joining portion 34 at which the first metal portion 31 and the second metal portion 35 are joined. A rectangle-shaped terminal attachment hole 32B to which the detection terminal 37 is attached is formed in a terminal joining portion 32 of the connection member 30.

The terminal joining portions 32 and the member joining portion 34 are disposed in intersecting directions. More specifically, the member joining portion 34 is formed by approximately orthogonally bending one of a pair of side edges in the longitudinal direction of the metal plate member constituting the first metal portion 31 and the metal plate member constituting the second metal portion 35. Joining surfaces 34A of the member joining portion 34 are set so as to be approximately orthogonal to joining surfaces 32A of the terminal joining portions 32, to which the lead terminals 13 are to be joined. The dimension in the longitudinal direction of the member joining portion 34 is set to be smaller than the dimension in the longitudinal direction of the terminal joining portions 32.

Also, in the connection member 30, the fixed portions 33 to be fixed to the holding member 21 are oriented in a direction intersecting the terminal joining portions 32 and the fixed portions 33 are provided so as to protrude outward with respect to the terminal joining portions 32. More specifically, on one side edge in the longitudinal direction of the metal plate member that constitutes the first metal portion 31 and the metal plate member that constitutes the second metal portion 35, the fixed portions 33 are formed by orthogonally bending the side edges on the side opposite to the side edges on which the member joining portion 34 is formed, and the fixed portions 33 are provided at the four corner portions of the connection member 30. The fixed portions 33 are fixed to the holding member 21 due to the movement in the front-rear direction being restricted by the retaining protrusions 25 of the holding member 21 and the movement in the up-down direction being restricted by the pressing pieces 26 of the holding member 21. The fixed portions 33 protrude outward with respect to the end portions (in the longitudinal direction) of the terminal joining portions 32, and the portions (protruding portions 33A) that protrude are fixed by the holding member 21.

In the electricity storage element group 11, the electricity storage elements 12 are stacked such that lead terminals 13 with the same polarities are aligned vertically in groups of two. Specifically, in the electricity storage element group 11, the frontward lead terminals 13 are aligned in the following order, starting from the top: anode, anode, cathode, cathode, anode, anode, . . . , and the rearward lead terminals 13 are aligned in the following order, starting from the top: cathode, cathode, anode, anode, cathode, cathode, . . . .

In front of the electricity storage element group 11, the two anode lead terminals 13B from the top are joined to the terminal joining portion 32 of an end portion connection member 30A, which is composed of only the second metal portion 35, and the two cathode lead terminals 13A from the bottom are joined to the terminal joining portion 32 of an end portion connection member 30A, which is composed of only the second metal portion 35. The lead terminals 13 other than these are joined in groups of two to the terminal joining portions 32 of the connection members 30, which are each formed by joining a first metal portion 31 and a second metal portion 35.

Examples of the method for welding the lead terminals 13 and the terminal joining portions 32 of the connection members 30 and the method for welding the lead terminals 13 and the external connection busbar 36 include laser welding and ultrasonic welding.

Method for Assembling the Electricity Storage Module 10

The end portions of the lead terminals 13 of the 24 electricity storage elements 12 are bent approximately orthogonally downward, and are stacked such that two lead terminals 13 that are vertically adjacent have the same polarity. Eleven connection members 30 shown in FIG. 9 and two end portion connection members 30A are prepared.

A connection member 30 can be produced by subjecting the metal plate member constituting the first metal portion 31 and the metal plate members constituting the second metal portion 35 to processing for pressing into a certain shape, and thereafter joining the member joining portion 34 of the first metal portion 31 and the second metal portion 35.

Next, the connection members 30 are attached to the holding members 21. When the connection members 30 are attached to the holding members 21, the fixed portions 33 of the connection members 30 are fixed to the holding members 21 due to the movement in the front-rear direction being restricted by the retaining protrusions 25 of the holding members 21 and the movement in the up-down direction being restricted by the pressing pieces 26 of the holding members 21.

The detection terminals 37 are fixed when the attachment claws of the detection terminals 37 are inserted into the terminal attachment holes 32B of the connection members 30, which are fixed to the holding members 21, the barrel portions of the detection terminals 37 are fixed to the terminal fixing portions 27 of the holding members 21, and the wires W1 connected to the detection terminals 37 are guided from the wire guiding portions 28.

Next, the multiple holding members 21 are coupled to form one plate shape, the wires W1 connected to the detection terminals 37 are routed in the wire routing portions 29 of the holding members 21, and thus the wire modules 20 attached to the front and rear of the electricity storage element group 11 are produced.

Next, the wire modules 20 are disposed frontward and rearward of the electricity storage element group 11, and the lead terminals 13 and the terminal joining portions 32 of the connection members 30 are joined using a welding method such as laser welding. At this time, the external connection busbar 36 is also connected to the wiring module 20 attached to the front.

Next, the front surface side cover 40A and the rear surface side cover 40B are attached, and when the wires W1 connected to the detection terminals 37 are electrically connected to the external device via the connector 50, the electricity storage module 10 shown in FIG. 1 is obtained.

Effects of the Present Embodiment

Next, effects of the present embodiment will be described. In the present embodiment, in the connection member 30, the member joining portion 34 at which the two metal portions 31 and 35 (the first metal portion 31 and the second metal portion 35) are joined and the terminal joining portions 32 that are joined with the lead terminals 13 are disposed in orthogonal directions (intersecting directions), and therefore the lead terminals 13 are not joined to regions with different types of metal when the lead terminals 13 are joined to the connection member 30.

As a result, according to the present embodiment, the lead terminals 13 can be welded to the entire region of the terminal joining portions 32, and therefore it is possible to provide an electricity storage module 10 in which lead terminals 13 composed of different metal materials can be electrically connected in a limited space. Also, according to the present embodiment, the cathode lead terminals 13A are joined to the first metal portions 31, which are composed of the same metal material thereas, and the anode lead terminals 13B are joined to the second metal portions 35, which are composed of the same metal material thereas, and therefore corrosion caused by contact between different metals is not likely to occur at the portions at which the lead terminals 13 and the connection members 30 are joined.

Also, in the present embodiment, in the connection member 30, the fixed portions 33 fixed to the holding member 21 are in a direction orthogonal to (direction intersecting with) the terminal joining portions 32 and are provided so as to protrude outward with respect to the end portions of the terminal joining portions 32, and therefore the fixed portions 33 are disposed so as to protrude in a direction intersecting the terminal joining portions 32 that are joined with the lead terminals 13, and so as to protrude outward with respect to the terminal joining portions 32. As a result, according to the present embodiment, when a task of joining the lead terminals 13 to the connection member 30 is performed, the fixed portions 33 do not hinder the task. In addition, according to the present embodiment, the lead terminals 13 are joined while the connection members 30 are held by the holding members 21, and therefore the task of joining the connection members 30 and the lead terminals 13 is easier to perform, and excellent productivity is achieved.

Note that according to the present embodiment, an electricity storage element group 11 in which electricity storage elements 12 are connected in parallel in groups of two is included, and therefore the number of connection members 30 and the number of holding members 21 can be reduced compared to the case where all of the electricity storage elements 12 constituting the electricity storage element group 11 are connected in series.

Other Embodiments

The technique disclosed in the present specification is not limited to the embodiment described by means of the disclosure above and the drawings, and may be an embodiment such as those described hereinafter, for example.

(1) In the above-described embodiment, the connection member 30 is shown as a connection member 30 including fixed portions 33 that are provided in a direction orthogonal to the terminal joining portions 32 and are provided so as to protrude outward with respect to the terminal joining portions 32, but the configuration of the fixed portions is not limited to this. Also, the connection member may have a configuration that does not include the fixed portions.

(2) In the above-described embodiment, a cathode lead terminal 13A made of aluminum or an aluminum alloy and an electricity storage element 12 having an anode lead terminal 13B made of copper or a copper alloy were shown, but it is sufficient that the materials constituting the cathode lead terminal 13A and the anode lead terminal 13B are different, and there is no limitation to the above-described materials.

(3) In the above-described embodiment, a connection member 30 was shown which is formed by joining a first metal portion 31 made of aluminum or an aluminum alloy and a second metal portion 35 made of copper or a copper alloy, but as long as the first metal portion is composed of the same metal material as the cathode lead terminal and the second metal portion is constituted by the same metal material as the anode lead portion, there is no limitation to this.

(4) In the above-described embodiment, an electricity storage element group 11 composed of 24 electricity storage elements 12 was shown, but the number of electricity storage elements constituting the electricity storage element group may be less than 24 or more than 24.

(5) In the above-described embodiments, it was indicated that the electricity storage elements 12 are connected in parallel in groups of two, but all of the electricity storage elements may be connected in series, and the electricity storage elements may be connected in parallel in groups of three or more.

(6) In the above-described embodiment, an example was given in which a secondary battery was used as the electricity storage element 12, but a capacitor, an electric condenser, or the like may be used as the electricity storage element.

LIST OF REFERENCE NUMERALS

10: Electricity storage module
11: Electricity storage element group
12: Electricity storage element
13: Lead terminal
13A: Cathode lead terminal
13B: Anode lead terminal
21: Holding member
25: Retaining protrusion
26: Pressing piece
30: Connection member
30A: End portion connection member
31: First metal part
32: Terminal joining portion
32A: Joining surface
33: Fixing portion
33A: Protruding portion
34: Member joining portion
34A: Joining surface
35: Second metal portion
40: Cover

The invention claimed is:

1. An electricity storage module comprising:
an electricity storage element group including a plurality of stacked electricity storage elements, each electricity storage element having lead terminals of a cathode and an anode that protrude from side edges thereof; and
a connection member that is joined to the lead terminals and electrically connects the electricity storage elements,
wherein the cathode lead terminal and the anode lead terminal are composed of different metal materials,
the connection member includes a first metal portion that is connected to the cathode lead terminal and is composed of the same metal material as the cathode lead terminal, and a second metal portion that is connected to the anode lead terminal and is composed of the same material as the anode lead terminal,
the first metal portion and the second metal portion each have a terminal joining portion that is joined with a lead terminal and a member joining portion at which the first metal portion and the second metal portion are joined, and
the terminal joining portion and the member joining portion extend in intersecting directions, wherein
an end portion of the cathode lead terminal abuts and extends parallel to a contact surface of the first metal portion, and an end portion of the anode lead terminal abuts and extends parallel to a contact surface of the second metal portion, and wherein
the end portions of the cathode lead terminal and anode lead terminal extend transverse to a joining surface of the member joining portion at which the first metal portion and the second metal portion are joined.

2. The electricity storage module according to claim 1, wherein in each terminal joining portion of the first metal portion and the second metal portion, two or more lead terminals are joined.

3. The electricity storage module according to claim 2, comprising
a holding member that is composed of an insulating material and holds the connection member,
wherein the connection member includes a fixed portion fixed to the holding member, the fixed portion extending in a direction intersecting with the terminal joining portion, and protruding outwardly with respect to the terminal joining portion.

* * * * *